United States Patent
Lin et al.

(10) Patent No.: US 7,855,897 B2
(45) Date of Patent: Dec. 21, 2010

(54) ELECTRONIC DEVICE

(75) Inventors: Shi-Tan Lin, Taipei (TW); Shih-Jen Chuang, Taipei (TW); Chien-Hsu Hou, Taipei (TW); Hsiang-Li Yu, Taipei (TW); Pei-Chin Wang, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 614 days.

(21) Appl. No.: 11/848,238

(22) Filed: Aug. 30, 2007

(65) Prior Publication Data

US 2008/0055839 A1 Mar. 6, 2008

(30) Foreign Application Priority Data

Sep. 1, 2006 (TW) .............................. 95132314 A

(51) Int. Cl.
*H05K 9/00* (2006.01)
(52) U.S. Cl. ...................... 361/799; 361/753; 361/816; 361/818; 174/350; 174/32; 174/371
(58) Field of Classification Search ................. 361/753, 361/799, 800, 816, 818; 174/350, 32, 371, 174/354
See application file for complete search history.

(56) References Cited

U.S. PATENT DOCUMENTS

| | | | | |
|---|---|---|---|---|
| 6,501,018 | B2 * | 12/2002 | Mayer | 174/370 |
| 6,900,288 | B1 * | 5/2005 | Behl et al. | 530/300 |
| 7,399,931 | B2 * | 7/2008 | Ball | 174/355 |
| 2002/0100598 | A1 * | 8/2002 | Mayer | 174/35 GC |
| 2007/0209832 | A1 * | 9/2007 | Ball | 174/370 |

* cited by examiner

*Primary Examiner*—Dameon E Levi
(74) *Attorney, Agent, or Firm*—Jianq Chyun IP Office

(57) ABSTRACT

An electronic device including a first portion, a second portion, and a circuit board is provided. The first portion has a first surface including a first conductive region. The second portion has a second surface including a second conductive region and a second nonconductive region. The second conductive region and the second nonconductive region are respectively in contact with a part of the first conductive region. The circuit board has a plurality of electronic components thereon, and the circuit board is disposed at one side of the first portion and the second portion.

12 Claims, 6 Drawing Sheets

II-II'

ELECTRONIC DEVICE

CROSS-REFERENCE TO RELATED APPLICATION

This application claims the priority benefit of Taiwan application serial no. 95132314, filed Sep. 1, 2006. All disclosure of the Taiwan application is incorporated herein by reference.

BACKGROUND OF THE INVENTION

1. Field of the Invention

The present invention relates to an electronic device. More particularly, the present invention relates to a notebook PC having a touch pad.

2. Description of Related Art

Along with the development of electronic technology, various electronic devices have entered our daily life, and in particular, the development of computer has greatly modernized our life. Presently, the most commonly-used personal computers (PC) include desktop computers and portable computers, and portable computers further include notebook PC, pocket PC, and tablet PC etc. The commonest command input method for notebook PC includes using a keyboard. To allow users to input commands to a computer system conveniently, a touch pad is usually disposed on a notebook PC. In addition, some components of a notebook PC (for example, the touch pad) are usually plated to make the notebook PC to appear metallic.

However, human body carries static electricity more or less, thus, when a user is using a touch pad, the static electricity carried by the user is passed to the touch pad through the fingers of the user to cause electro-static discharge (ESD). The static current produced by ESD may be conducted to the circuit board inside the notebook PC through the metallic plating on the surface of the touch pad, which may cause damage to the electronic components on the circuit board. On the other hand, if electricity leakage occurs in some of the electronic components in the notebook PC, the leakage current may be conducted to the metallic surface of the touch pad and the user may get hurt while operating the touch pad.

SUMMARY OF THE INVENTION

Accordingly, the present invention is directed to an electronic device capable of resolving the problem of electricity leakage as in the case of the prior art described above.

According to another aspect of the present invention, an electronic device is provided, wherein the possibility of electro-static discharge (ESD) damage to the electronic device while a user is operating the electronic device may reduced or avoided.

To achieve aforementioned and other objectives, the present invention provides an electronic device including a first portion, a second portion, and a circuit board. The first portion has a first surface having a first conductive region. The second portion has a second surface having a second conductive region and a second nonconductive region. The second conductive region and the second nonconductive region are respectively in contact with a part of the first conductive region. The circuit board has a plurality of electronic components thereon. The circuit board is disposed at one side of the first portion and the second portion.

According to an embodiment of the present invention, the first portion further includes a third surface opposite to the first surface, the second portion further includes a fourth surface opposite to the second surface, the fourth surface further includes a fourth conductive region and a fourth nonconductive region, and the fourth conductive region is electrically connected to the second conductive region.

According to an embodiment of the present invention, the first conductive region, the second conductive region, and the fourth conductive region are comprised of a metal coating, and the second nonconductive region and the fourth nonconductive region are comprised of a laser-etched region, wherein the laser-etched region and the third surface are nonconductive.

According to an embodiment of the present invention, the disposition area of the second nonconductive region is smaller than that of the fourth nonconductive region.

According to an embodiment of the present invention, the second nonconductive region and the fourth nonconductive region are comprised of a close annular region.

According to an embodiment of the present invention, the second portion is a plated object.

According to an embodiment of the present invention, the second portion is tapped to the first portion.

According to an embodiment of the present invention, the first portion further includes a fifth nonconductive region, the first surface further includes a first nonconductive region, the third surface further includes a third conductive region and a third nonconductive region, the fifth nonconductive region is connected to the third nonconductive region and the first nonconductive region, and the first nonconductive region and the second nonconductive region are overlapped in part.

According to an embodiment of the present invention, the disposition area of the first nonconductive region is smaller than that of the second nonconductive region.

According to an embodiment of the present invention, the first conductive region, the second conductive region, the third conductive region, and the fourth conductive region are comprised of a metal coating, the first nonconductive region, the second nonconductive region, the third nonconductive region, the fourth nonconductive region, and the fifth nonconductive region are comprised of a laser-etched region, and the laser-etched region is nonconductive.

According to an embodiment of the present invention, the disposition area of the second nonconductive region is larger than that of the fourth nonconductive region.

According to an embodiment of the present invention, the first portion and the second portion are comprised of a plated object.

According to an embodiment of the present invention, the first portion is tapped to the second portion.

In an electronic device of the present invention, the first surface has a first conductive region, the second surface has a second conductive region and a second nonconductive region, and the second conductive region and the second nonconductive region are respectively in contact with a part of the first conductive region, thus, the current passing through the first conductive region is restricted by the second nonconductive region when the current is conducted to the second portion and won't be conducted to the components tapped to the second portion. On the other hand, when the user touches the components tapped to the second portion, in an event of an ESD, the static current conducted to the second portion can be conducted to the first conductive region via the second conductive region and then transmitted to the ground terminal of the electronic device.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
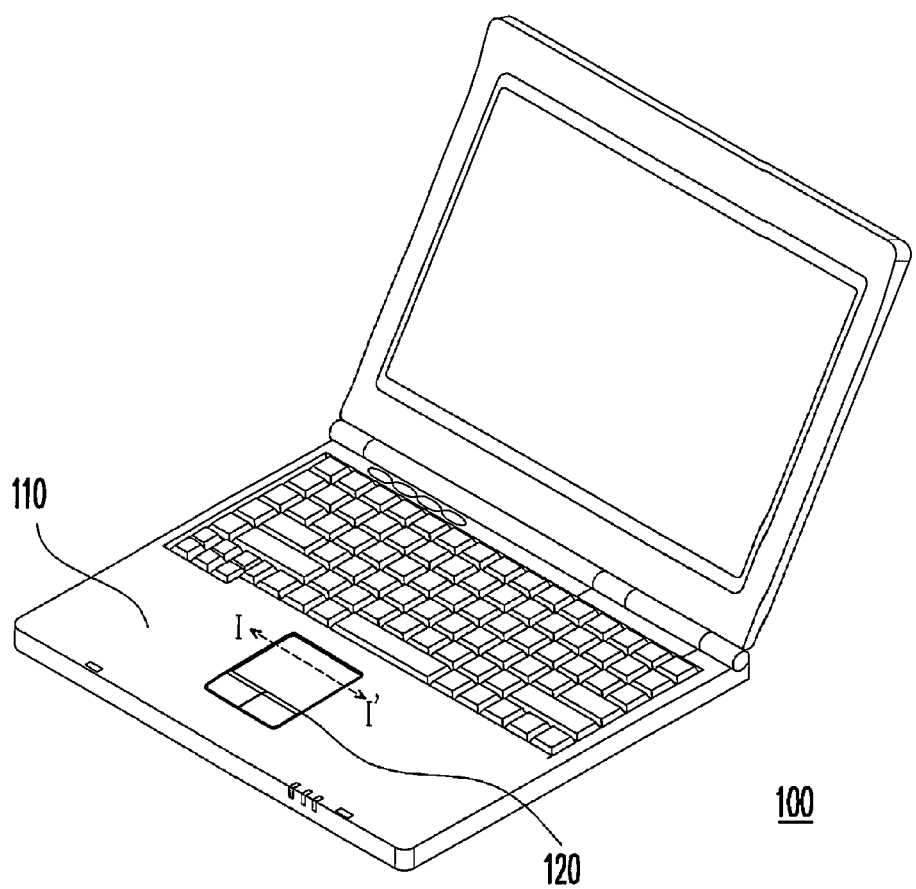
FIG. 1 is a diagram of an electronic device according to an exemplary embodiment of the present invention.
Figure 2:
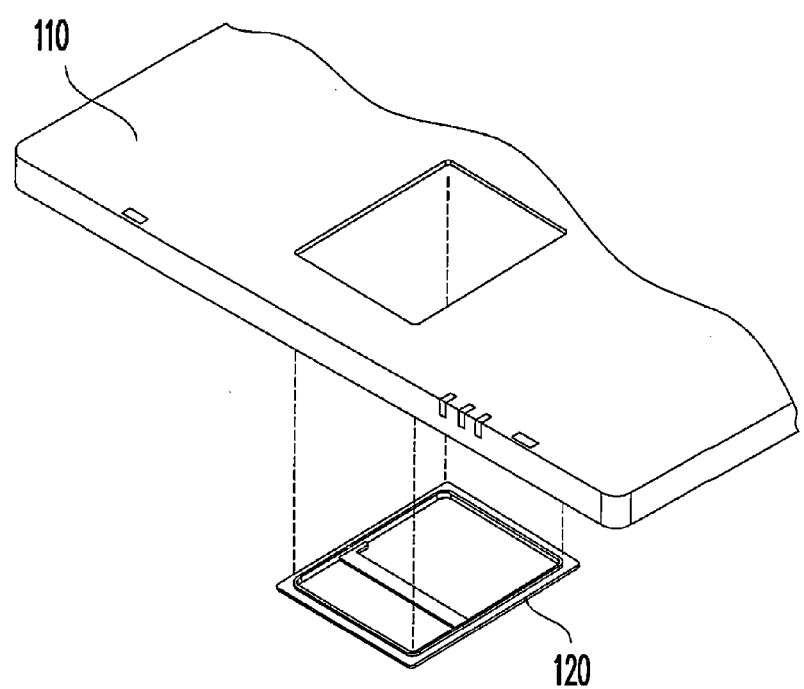
FIG. 2 is an exploded diagram of the first portion and the second portion of the electronic device in FIG. 1.
Figure 3:
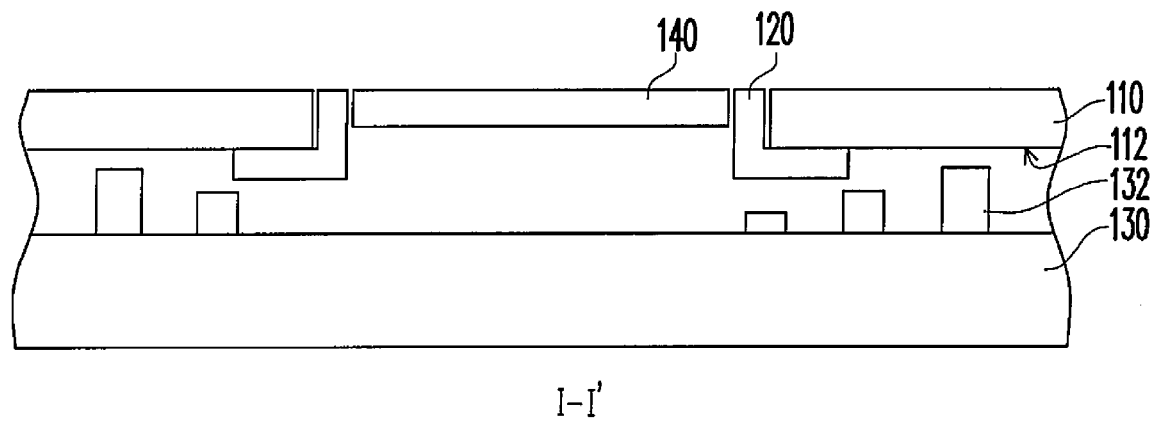
FIG. 3 is a cross-sectional view of the electronic device in FIG. 1 cut along line I-I'.

FIG. 1 is a diagram of an electronic device according to an exemplary embodiment of the present invention. FIG. 2 is an explosion diagram of the first portion and the second portion of the electronic device in FIG. 1. FIG. 3 is a cross-sectional view of the electronic device in FIG. 1 cut along line I-I'. Referring to FIG. 1, FIG. 2, and FIG. 3 all together, the electronic device 100 in the present embodiment may be a notebook PC which includes a first portion 110, a second portion 120, and a circuit board 130. Wherein the first portion 110 may be a case of the notebook PC, the second portion 120 may be a touch pad frame tapped to the case (first portion 110), and the circuit board 130 having a plurality of electronic components 132 thereon is disposed at one side of the first portion 110 and the second portion 120. For example, the circuit board 130 is a motherboard disposed in the notebook PC or an induction circuit board under the touch pad.

Figure 4:
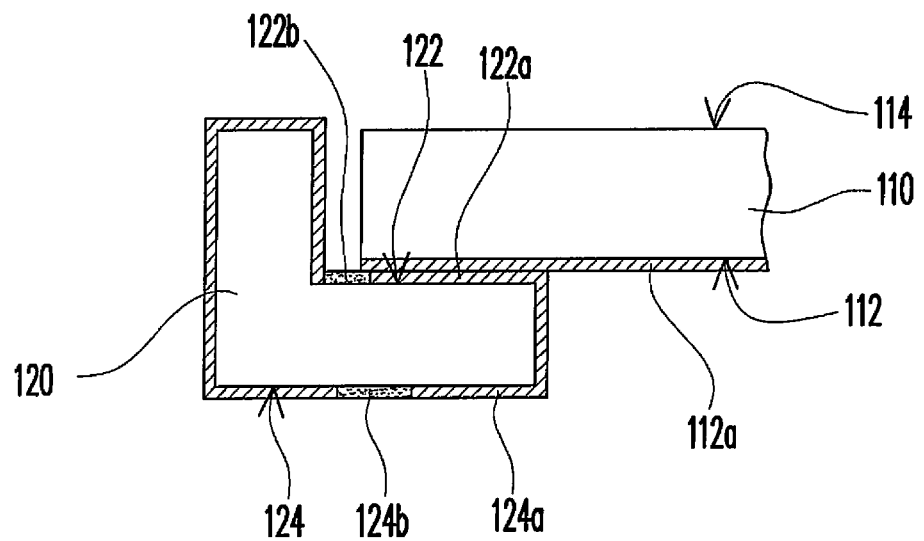
FIG. 4 is a diagram illustrating the connection between the case and the touch pad frame in FIG. 3.

As described above, referring to FIG. 4, where the tapping connection between the touch pad frame (second portion 120) and the case (first portion 110) is shown. FIG. 4 is a diagram illustrating the connection between the case (first portion 110) and the touch pad frame (second portion 120) in FIG. 3. As shown in FIG. 4, the first portion 110 (case) has a first surface 112 and a third surface 114 opposite to each other, wherein the first surface 112 has a first conductive region 112a, which may be a metal coating. The second portion 120 (touch pad frame) has a second surface 122 and a fourth surface 124 opposite to each other. The second surface 122 has a second conductive region 122a and a second nonconductive region 122b, the fourth surface 124 has a fourth conductive region 124a and a fourth nonconductive region 124b. The second conductive region 122a and the second nonconductive region 122b are respectively in contact with a part of the first conductive region 112a, and the fourth conductive region 124a may be electrically connected to the second conductive region 122a. Besides, in the present embodiment, the disposition area of the second nonconductive region 122b may be smaller than that of the fourth nonconductive region 124b. In other words, the insulating resistance of the second nonconductive region 122b is smaller than that of the fourth nonconductive region 124b.

Figure 5A:
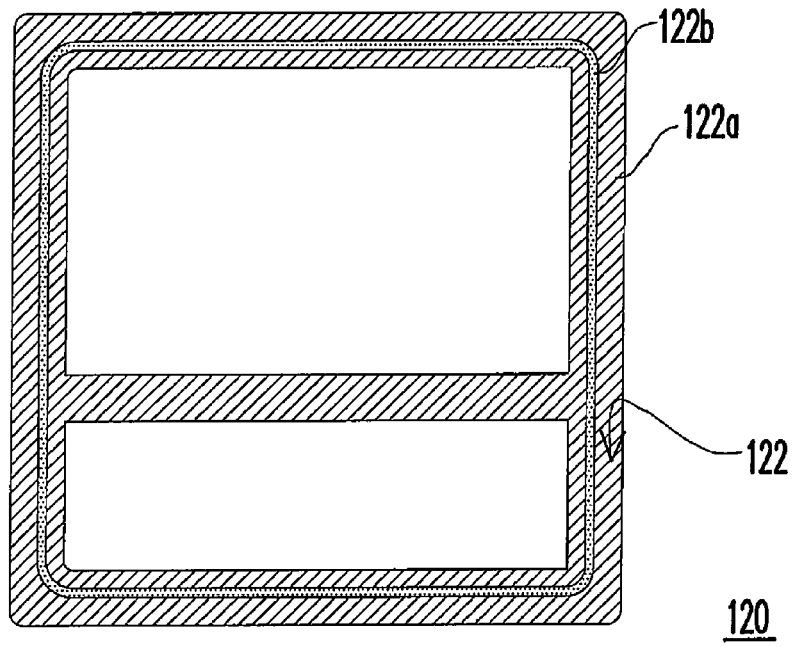
FIG. 5A is a vertical view of the touch pad frame in FIG. 2.
Figure 5B:
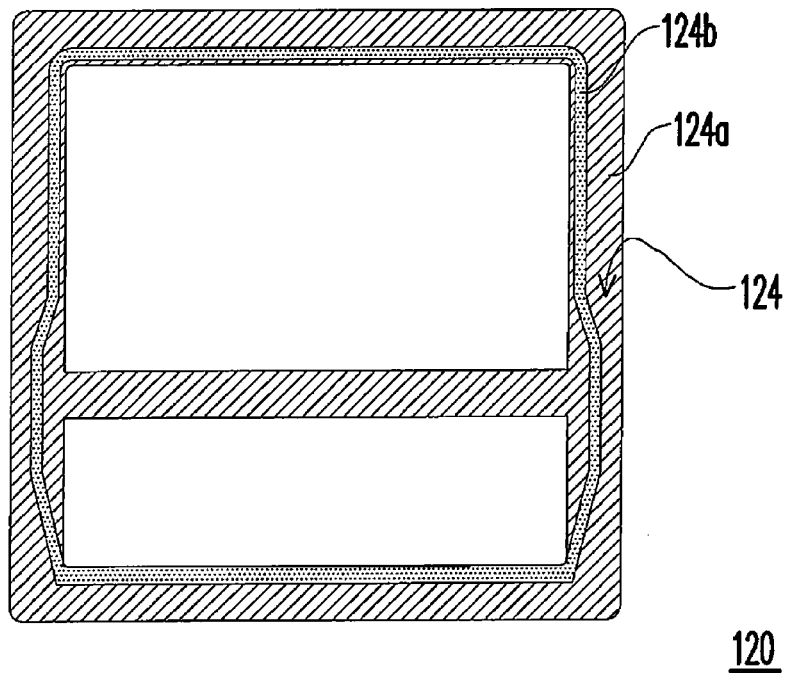
FIG. 5B is a bottom view of the touch pad frame in FIG. 2.

In the present embodiment, the second portion 120 (touch pad frame) may be a plated object. In other words, the second conductive region 122a of the second surface 122 and the fourth conductive region 124a of the fourth surface are metal coating. The second nonconductive region 122b may be formed by performing a laser etching on the metal coating formed on the second surface 122. Similarly, the fourth nonconductive region 124b may be formed by performing a laser etching on the metal coating formed on the fourth surface 124. FIG. 5A is a vertical view of the touch pad frame in FIG. 2. FIG. 5B is a bottom view of the touch pad frame in FIG. 2. Referring to FIG. 5A and FIG. 5B, the second nonconductive region 122b and the fourth nonconductive region 124b may be a closed annular region formed through the aforementioned laser etching technology, which means the second nonconductive region 122b and the fourth nonconductive region 124b are nonconductive laser-etched region. Besides, the third surface 114 may be nonconductive.

In the present embodiment, since the second conductive region 122a and the second nonconductive region 122b of the second portion 120 (touch pad frame) are respectively in contact with a part of the first conductive region 112a of the first portion 110 (case) (referring to FIG. 4), when electricity leakage occurs in the electronic components 132 on the circuit board 130 (referring to FIG. 3), the leakage current can be easily conducted to the first conductive region 112a through the contact between the electronic components 132 and the first surface 112. Wherein, the leakage current passing through the first conductive region 112a is restricted by the second nonconductive region 122b and the fourth nonconductive region 124b when the leakage current is conducted to the second portion 120 (touch pad frame) and won't be conducted to the components tapped to the second portion 120 (for example, the touch pad 140 in FIG. 3), so that the user is prevented from touching any electrified component.

On the other hand, since the insulating resistance of the second nonconductive region 122b is smaller than that of the fourth nonconductive region 124b, thus, if ESD occurs when the user is operating the components such as the touch pad 140 (referring to FIG. 3), the static current in the touch pad 140 passes through the second conductive region 122a and is conducted to the first conductive region 112a via the second nonconductive region 122b of smaller insulating resistance, and then is conducted to the ground terminal of the electronic device 100 by the first conductive region 112a. In other words, the static current won't be conducted to the circuit board 130 so that the electronic components 132 on the circuit board 130 won't be damaged and further the service life of the electronic device is unaffected.

Moreover, the tapping connection between the first portion 110 (case) and the second portion 120 (touch pad frame) in FIG. 4 is not intended for limiting the present invention. Other embodiments of the present invention will be described below, wherein like reference numerals refer to the like elements throughout for the convenience of description.

Figure 6A:
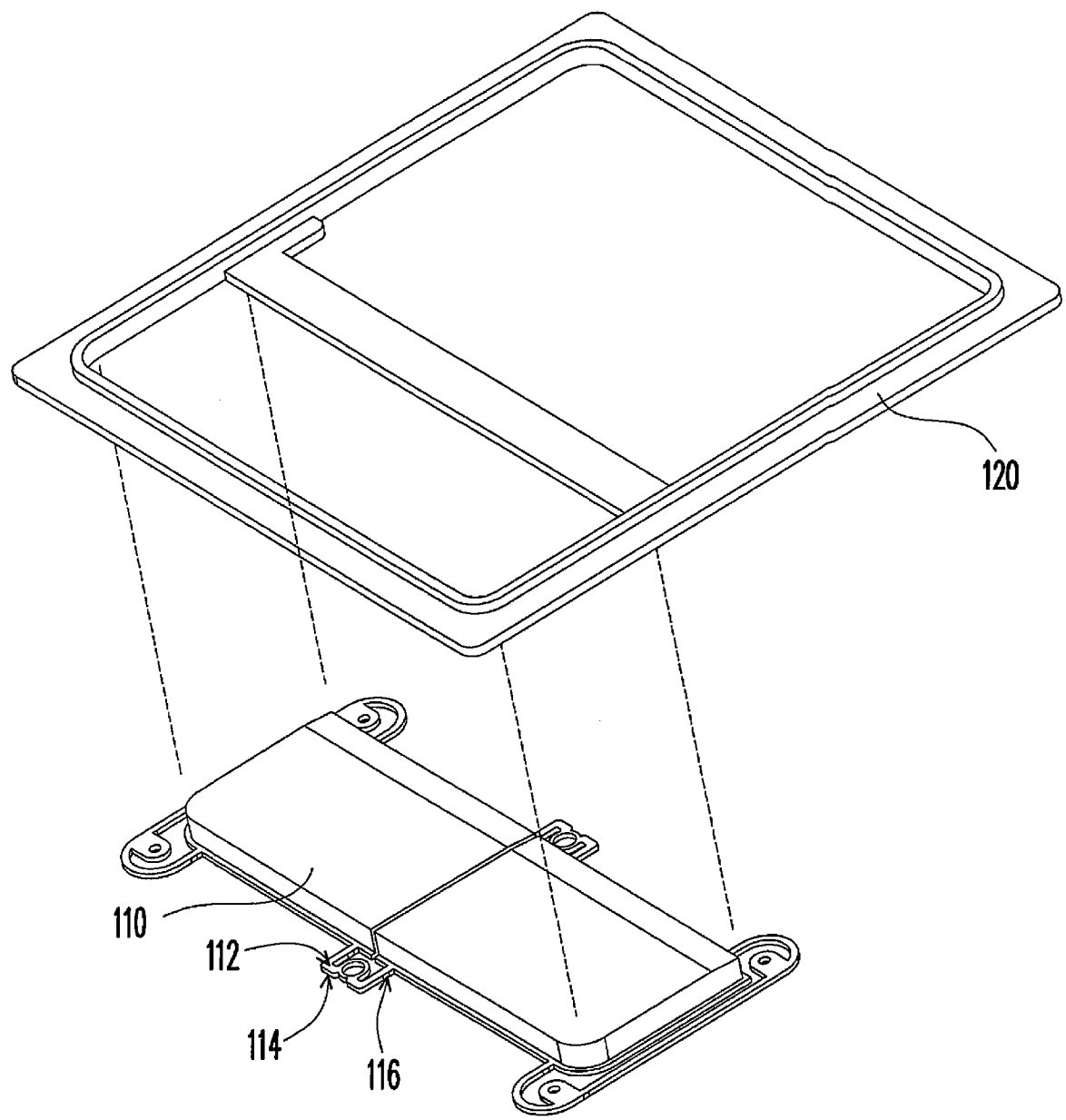
FIG. 6A is an exploded diagram of a touch pad frame and a button.
Figure 6B:
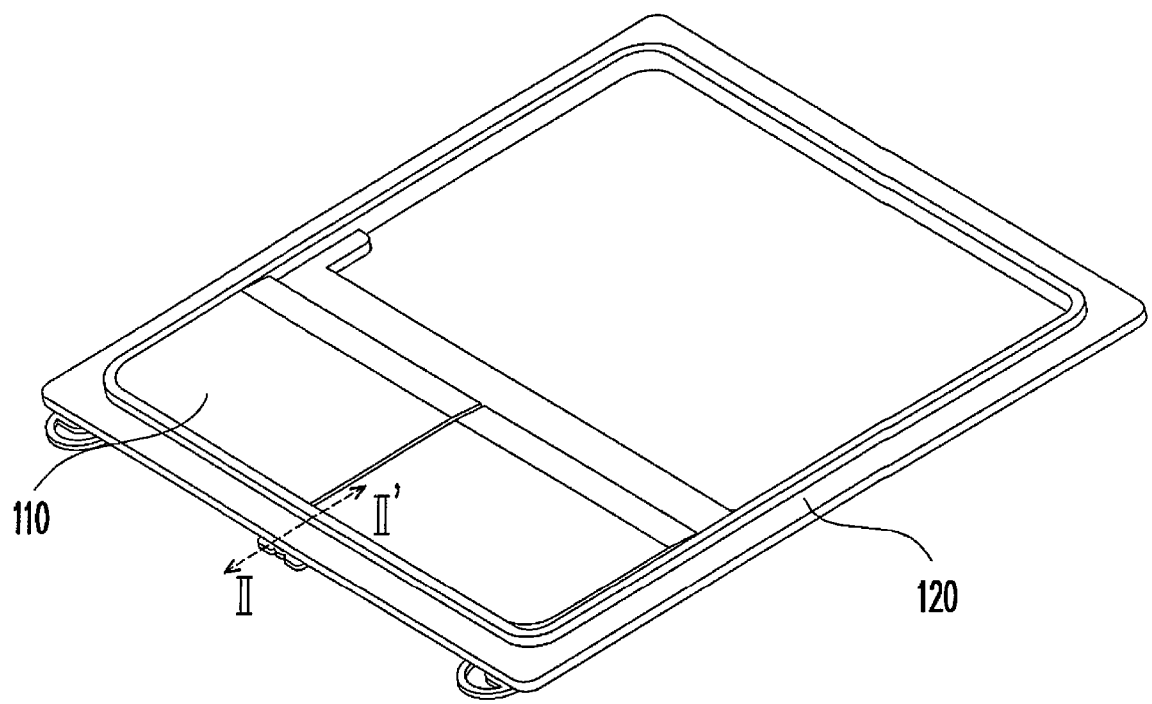
FIG. 6B is a comprehensive diagram of a touch pad frame and a button.
Figure 7:
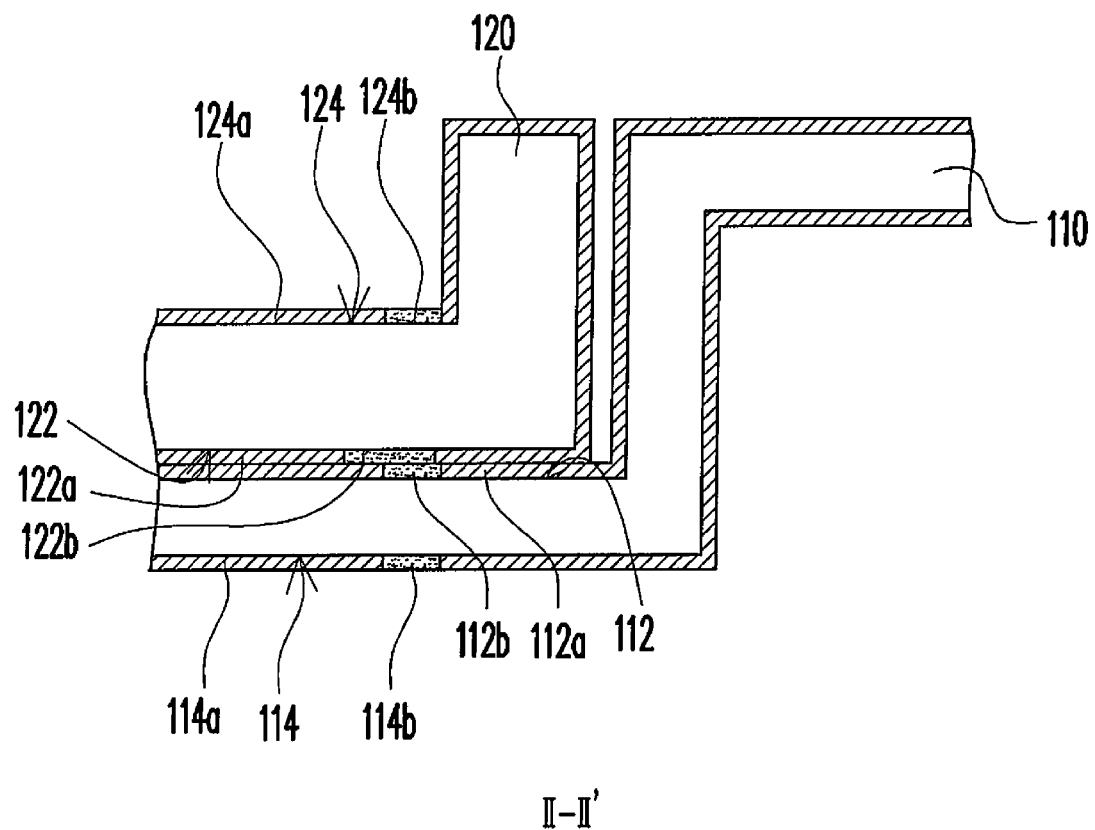
FIG. 7 is a cross-sectional view of the touch pad frame and button in FIG. 6B cut along line II-II'.

According to another exemplary embodiment of the present invention, the second portion 120 may be a touch pad frame, and the first portion 110 may be a button tapped to the touch pad frame (second portion 120). FIG. 6A is an exploded diagram of the touch pad frame and the button. FIG. 6B is a comprehensive diagram of the touch pad frame and the button. FIG. 7 is a cross-sectional view of the touch pad frame and button in FIG. 6B cut along line II-II'. Referring to FIG. 6A, FIG. 6B, and FIG. 7 all together, the first portion 110 (button) has a first surface 112 and a third surface 114 opposite to each other, wherein the first surface 112 has a first conductive region 112a and a first nonconductive region 112b, and the third surface 114 has a third conductive region 114a and a third nonconductive region 114b. In the present embodiment, the first portion 110 (button) further includes a fifth nonconductive region 116 connected to the third nonconductive region 114b and the first nonconductive region 112b so that two sides of the first nonconductive region 112b are electrically insulated. The first portion 110 (button) may be a plated object. In other words, the first conductive region 112a of the first surface 112 and the third conductive region 114a of the third surface 114 are comprised of a metal coating. Besides, the first nonconductive region 112b, the third nonconductive region 114b, and the fifth nonconductive region 116 may be comprised of an aforementioned nonconductive laser-etched region.

Moreover, the second portion 120 (touch pad frame) in the present embodiment is the same, which is the touch pad frame in the embodiment described above therefore detailed description repeated herein. In addition, the circuit board 130 is disposed at one side of the first portion 110 (button) and the second portion 120 (touch pad frame), and the circuit board 130 has a plurality of electronic components 132 thereon. The tapping connection between the touch pad frame (second portion 120) and the button (first portion 110) will be described in detail below.

Referring to FIG. 7, the second conductive region 122a and the second nonconductive region 122b of the second portion 120 (touch pad frame) are respectively in contact with a part of the first conductive region 112a of the first portion 110 (button), and the first nonconductive region 112b and the second nonconductive region 122b are partially overlapped, wherein the disposition area of the first nonconductive region 112b is smaller than that of the second nonconductive region 122b. Accordingly, since the second surface 122 of the second portion 120 (touch pad frame) has the second nonconductive region 122b and the first surface 112 of the first portion 110 (button) has the first nonconductive region 112b partially overlapped with the second nonconductive region 122b, when a leakage current of the circuit board 130 (referring to FIG. 3) is conducted to the second portion 120 (touch pad frame), the leakage current won't be conducted to the surface of the first portion 110 (button) which is being pressed by the user, so that the user won't be hurt when touching the electrified surface of the first portion 110 (button).

On the other hand, when ESD occurs while the user presses down the button (first portion 110), the static current on the button (first portion 110) is passed through the first conductive region 112a and is conducted to the second conductive region 122a which partially in contact with the first conductive region 112a via the first nonconductive region 112b of smaller insulating resistance, and then the static current is conducted to the ground terminal of the electronic device 100 by the second conductive region 122a. In other words, the static current won't be conducted to the circuit board 130 (referring to FIG. 3) so that it is prevented from damaging the electronic components 132 and further from affecting the lifespan of the electronic device.

In summary, two connected components (the first portion and the second portion) with metal coating are included in the present invention, and the leakage current on the first portion is restricted by at least one nonconductive region disposed on the first portion or the second portion so that a user is prevented from being hurt by electricity when the user touches the second portion. On the other hand, the static current produced on the second portion is conducted to the first portion via the nonconductive region and is conducted to the ground terminal. To be specific, the electronic device of the present invention has good metallic appearance and when a user is operating the electronic device, the possibility of damages to the electronic device caused by ESD or injury to the user caused by leakage current in the electronic device can be reduced or eliminated.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic device, comprising:
   a first portion, having a first surface comprising a first conductive region;
   a second portion, having a second surface comprising a second conductive region and a second nonconductive region, the second conductive region and the second nonconductive region being respectively in contact with a part of the first conductive region; and
   a circuit board, having a plurality of electronic components, the circuit board being disposed at one side of the first portion and the second portion,
   wherein the first portion further comprises a third surface opposite to the first surface, the second portion further comprises a fourth surface opposite to the second surface, the fourth surface further comprises a fourth conductive region and a fourth nonconductive region, and the fourth conductive region is adjacent to the second conductive region.

2. The electronic device as claimed in claim 1, wherein the first conductive region, the second conductive region, and the fourth conductive region comprise a metal coating, the second nonconductive region and the fourth nonconductive region are comprised of a laser-etched region, and the laser-etched region and the third surface are nonconductive.

3. The electronic device as claimed in claim 1, wherein the disposition area of the second nonconductive region is smaller than the disposition area of the fourth nonconductive region.

4. The electronic device as claimed in claim 1, wherein the second nonconductive region and the fourth nonconductive region are a closed annular region.

5. The electronic device as claimed in claim 1, wherein the second portion comprises a plated object.

6. The electronic device as claimed in claim 1, wherein the second portion is tapped to the first portion.

7. The electronic device as claimed in claim 1, wherein the first portion further comprises a fifth nonconductive region, the first surface further comprises a first nonconductive region, the third surface further comprises a third conductive region and a third nonconductive region, the fifth nonconductive region is adjacent to the third nonconductive region and the first nonconductive region, and the first nonconductive region and the second nonconductive region are partially overlapped.

8. The electronic device as claimed in claim 7, wherein the disposition area of the first nonconductive region is smaller than that of the second nonconductive region.

9. The electronic device as claimed in claim 7, wherein the first conductive region, the second conductive region, the third conductive region, and the fourth conductive region comprise a metal coating, the first nonconductive region, the second nonconductive region, the third nonconductive region, the fourth nonconductive region, and the fifth nonconductive region comprise a laser-etched region, and the laser-etched region is nonconductive.

10. The electronic device as claimed in claim 7, wherein the disposition area of the second nonconductive region is larger than that of the fourth nonconductive region.

11. The electronic device as claimed in claim 7, wherein the first portion and the second portion comprise a plated object.

12. The electronic device as claimed in claim 7, wherein the first portion is tapped to the second portion.

* * * * *